United States Patent [19]

Merrill et al.

[11] Patent Number: 5,931,399
[45] Date of Patent: Aug. 3, 1999

[54] FISHING REEL ANTI-REVERSE MECHANISM

[75] Inventors: Scott T. Merrill, Mounds; Kent L. Zwayer, Tulsa, both of Okla.

[73] Assignee: Zebco Division of Brunswick Corporation, Tulsa, Okla.

[21] Appl. No.: 08/971,070

[22] Filed: Nov. 14, 1997

[51] Int. Cl.$^6$ .................................................. A01K 89/02
[52] U.S. Cl. ............................................................ 242/247
[58] Field of Search ................................... 242/247, 234, 242/238, 239, 299, 300

[56] References Cited

U.S. PATENT DOCUMENTS

| | | | |
|---|---|---|---|
| Re. 27,205 | 10/1971 | Willis et al. | 242/319 |
| 3,044,730 | 7/1962 | Yeada | 242/247 |
| 3,050,271 | 8/1962 | Hull | 242/247 |
| 3,069,109 | 12/1962 | Golec | 242/239 |
| 3,298,628 | 1/1967 | Harrington et al. | 242/239 |
| 4,154,413 | 5/1979 | Hull | 242/84.2 A |
| 4,156,510 | 5/1979 | Hull | 242/84.2 A |
| 4,997,143 | 3/1991 | Grice | 242/311 |
| 5,320,303 | 6/1994 | Puryear | 242/321 |
| 5,775,613 | 7/1998 | Zwayer et al. | 242/247 |

*Primary Examiner*—Donald P. Walsh
*Assistant Examiner*—Minh-Chau Pham
*Attorney, Agent, or Firm*—Fellers, Snider, Blankenship, Bailey & Tippens

[57] ABSTRACT

An anti-reverse apparatus for a fishing reel comprising: (a) a ratchet member mounted on a main operating shaft of the fishing reel and (b) an engaging structure incorporated in a crankshaft assembly of the fishing reel. The engaging structure is operable for directly engaging the ratchet member to thereby prevent reverse rotation of the main operating shaft and of the crankshaft assembly. The engaging structure is preferably received in a recess provided in a crankshaft drive gear. The inventive apparatus preferably also comprises a boss projecting from the reel frame for retaining the engaging structure in the recess. The engaging structure preferably comprises: a plate having a first side and an aperture extending through the plate; a first arm extending from the first side for engaging the ratchet gear; and a second arm extending from the first side for contacting the frame boss in order to limit the axial and rotational movement of the engaging structure.

21 Claims, 3 Drawing Sheets

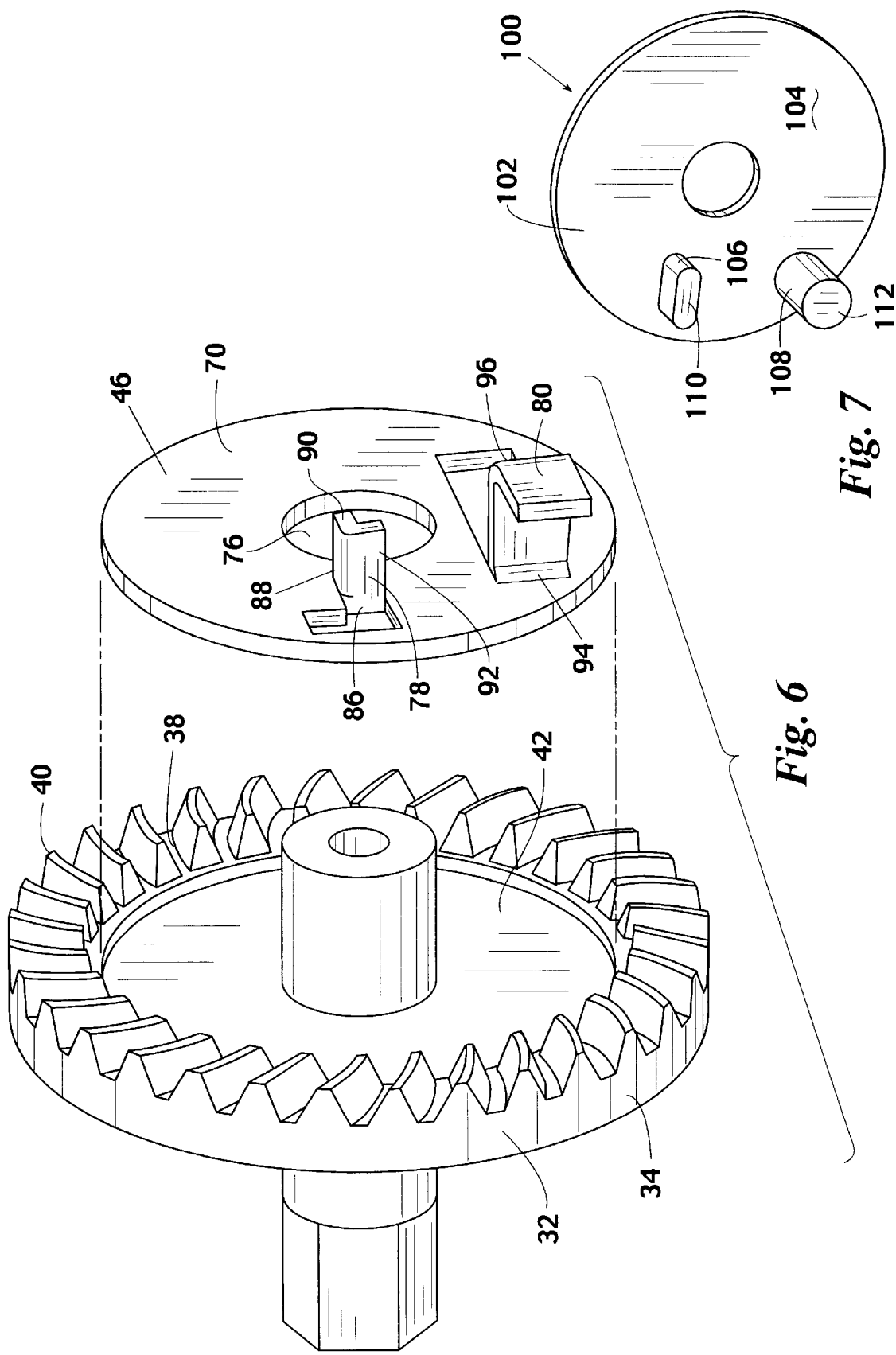

FISHING REEL ANTI-REVERSE MECHANISM

FIELD OF THE INVENTION

The present invention relates to anti-reverse mechanisms for fishing reels. More particularly, but not by way of limitation, the present invention relates to anti-reverse mechanisms for spincast-type fishing reels.

BACKGROUND OF THE INVENTION

Spincast fishing reels are well known in the art. A spincast reel will typically include: a central frame; a front cover positionable over at least the front face of the frame and having a tapered forward wall; a back cover positionable over at least the back face of the frame; a casting button projecting from the back cover; a crankshaft extending laterally into the side of the reel; a crank handle secured on the exterior end of the crankshaft; and a foot structure, extending from either the bottom of the frame or the bottom of the back cover, for securing the reel on a fishing rod. Most of the reel's operating structures and operating mechanisms are either mounted on, formed on, or mounted through the frame. The crank assembly is operable for winding a fishing line around a spool contained within the reel. The spool is typically mounted on a spool hub projecting from the forward face of the frame.

The operating structures and mechanisms contained in a spincast reel typically include: an elongate, main operating shaft slidably and rotatably extending through the spool hub; a spinnerhead secured to the forward end of the main operating shaft; a helical gear positioned around the main shaft; a drive gear (typically a face gear) secured on the interior portion of the crankshaft; an adjustable drag system; and an anti-reverse mechanism for preventing reverse rotation of the main operating shaft and of the crank assembly.

The helical gear is typically retained adjacent the rear face (i.e., the deck plate) of the frame. The helical gear is keyed on the main shaft for imparting rotational movement to the main shaft while allowing the shaft to slide longitudinally. The drive gear operably engages the helical gear such that rotational movement can be imparted to the main shaft by turning the crank handle.

U.S. Pat. No. 4,154,413 discloses a ratchet and pawl-type anti-reverse mechanism. The U.S. Pat. No. 4,154,413 mechanism comprises: a ratchet sleeve; a plurality of ratchet teeth projecting radially from the ratchet sleeve; and a pawl. The ratchet sleeve is mounted on the crankshaft of the reel such that the crankshaft cannot rotate independently of the ratchet sleeve. The pawl comprises: a flat, C-shaped body; a pair of inwardly projecting teeth formed on the ends of the C-shaped body; and a tab projecting rearwardly from the center of the body. A slot is provided in the deck plate of the reel frame for pivotably receiving the tab. When the tab is received in the slot, the body of the pawl partially encompasses the ratchet member. The pawl interacts with the ratchet member and pivots as necessary to both allow the forward rotation of the crankshaft and prevent the crankshaft from rotating in the reverse direction.

Another type of ratchet and pawl mechanism known in the art comprises: a plurality of ratchet teeth formed on the back face of the crankshaft drive gear; a pawl having a single tooth for engaging the ratchet teeth; and a pawl actuator mounted on the crankshaft. The pawl is pivotably mounted on the reel frame for movement toward and away from the ratchet teeth. The crankshaft carries the actuator such that, when the crankshaft begins to rotate in the reverse direction, the actuator moves the pawl into engagement with the ratchet teeth. When, on the other hand, the crankshaft begins to rotate in the forward direction, the actuator moves the pawl away from the ratchet teeth.

U.S. Pat. No. 4,156,510 discloses an anti-reverse mechanism comprising: a friction lever carried by the main shaft of the fishing reel; a tab formed on the friction lever; and a stop lever pivotably mounted on the deck plate of the reel frame. The friction lever tab engages a slot provided in the stop lever. When the main shaft assembly rotates in a clockwise (forward) direction, the assembly moves the friction lever to a final clockwise position. As it moves clockwise, the friction lever pushes the stop lever to an outward position where the stop lever cannot interfere with the forward rotation of the main shaft. However, when the main shaft and helical gear begin to rotate in a counterclockwise (reverse) direction, the friction lever moves the stop lever toward engagement with the helical gear. Upon engaging the helical gear, the stop lever prevents the helical gear and the main shaft from rotating in the reverse direction.

The anti-reverse mechanisms heretofore used in the art have significant shortcomings. Prior mechanisms typically take up a significant amount of space within the reel and/or involve a significant number of individual parts. The prior mechanisms are also typically difficult to assemble and install. Additionally, any mechanism which directly engages the teeth of the main shaft helical gear, or of any other operating gear, can easily damage or destroy the gear.

SUMMARY OF THE INVENTION

The present invention satisfies the needs and alleviates the problems identified above. The present invention provides an anti-reverse apparatus which (a) requires relatively few parts, (b) can be quickly and easily installed, and (c) involves no harmful contact with any of the reel's operating gears.

In one aspect, the present invention provides an anti-reverse apparatus for a fishing reel wherein the fishing reel includes: a main operating shaft rotatably mounted in the fishing reel, the main operating shaft having a first direction of rotation and a second direction of rotation; rotating means, mounted on the main operating shaft, for rotating the main operating shaft; and drive means for driving the rotating means and thereby rotating the main shaft. The inventive anti-reverse apparatus comprises: (a) holding means, mounted on the main operating shaft, for holding the main operating shaft to prevent the main operating shaft from rotating and (b) engaging means for engaging the holding means such that the holding means prevents the main operating shaft from rotating in the second direction of rotation.

In another aspect, the present invention provides an actuator for a fishing reel anti-reverse mechanism comprising: a plate having a first side and having an aperture extending through the plate; engaging means, provided on the first side, for engaging a ratchet gear; and limiting means, provided on the first side, for limiting rotational movement of the actuator.

In yet another aspect, the present invention provides an anti-reverse apparatus for a fishing reel wherein: the fishing reel has a crankshaft assembly, the crankshaft assembly includes a crankshaft and a drive gear mounted on the crankshaft, and the crankshaft assembly has a forward direction of rotation and a reverse direction of rotation. The inventive anti-reverse apparatus comprises a ratchet member and an engaging structure. The engaging structure is incorporated in the crankshaft assembly and is operable for directly engaging the ratchet member. The direct engagement of the engaging structure with the ratchet member operates to prevent the crankshaft assembly from rotating in the reverse direction.

Further objects, features, and advantages of the present invention will be apparent upon examining the accompanying drawings and upon reading the following description of the preferred embodiments.

BRIEF DESCRIPTION OF THE DRAWINGS

FIG. 3 provides an elevational front view of a ratchet gear 44 used in inventive apparatus 2.

FIG. 6 provides an exploded perspective view showing engaging structure 46 in relation to a drive gear 32 contained in reel 4.

FIG. 7 provides a perspective view of an alternative embodiment 100 of the engaging structure used in the inventive anti-reverse apparatus.

DESCRIPTION OF THE PREFERRED EMBODIMENTS

Figure 1:
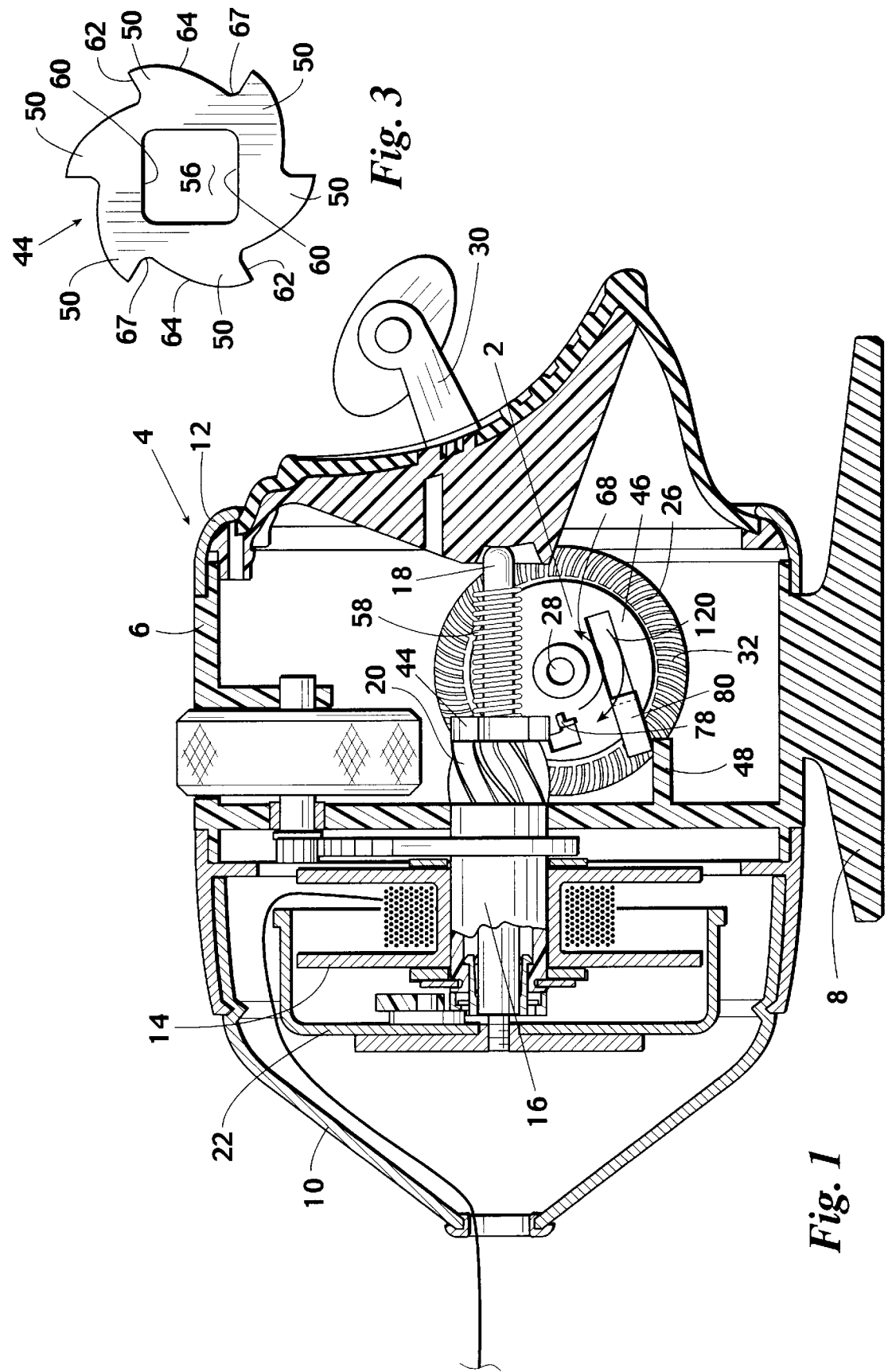
FIG. 1 provides a partially cutaway, elevational side view of a spincast reel 4 incorporating an embodiment 2 of the inventive anti-reverse apparatus.
Figure 2:
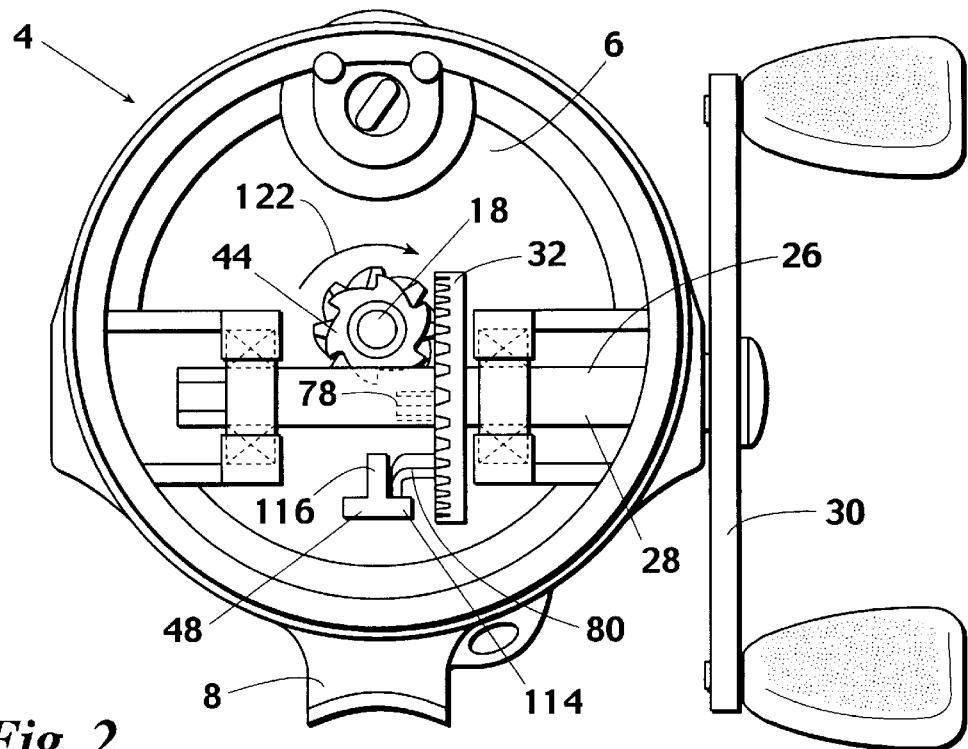
FIG. 2 provides a cutaway, elevational rear view of reel 4.
Figures 4, 5:
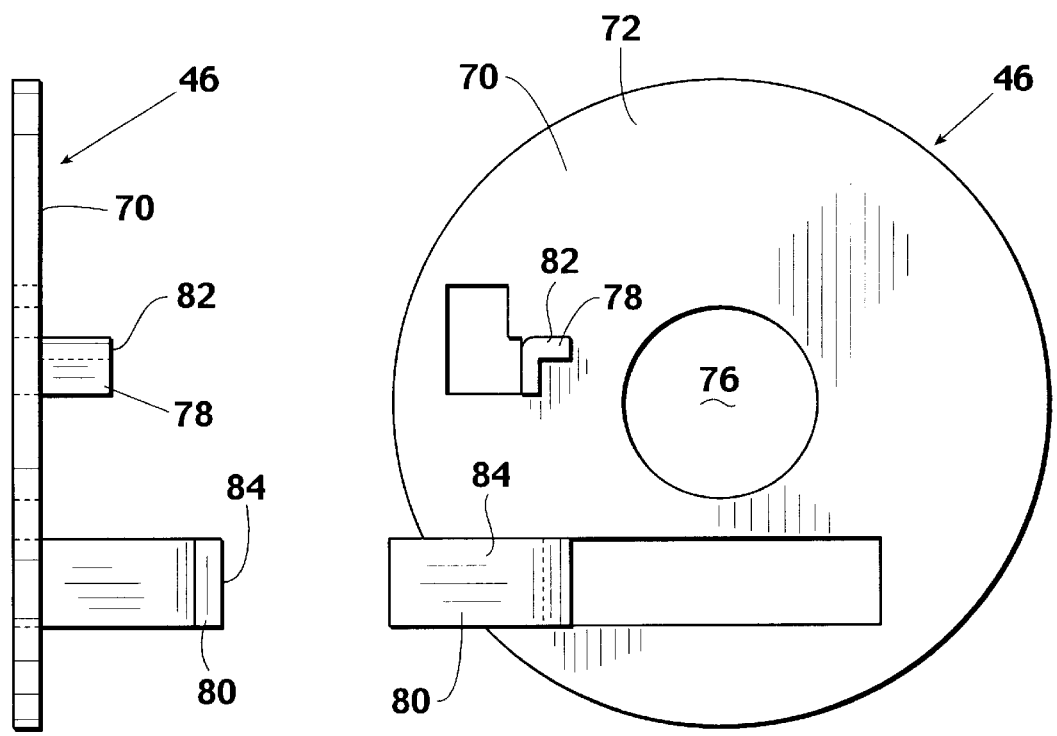
FIG. 4 provides an elevational front view of an engaging structure 46 used in inventive apparatus 2.
FIG. 5 provides an elevational side view of engaging structure 46.

An embodiment 2 of the inventive anti-reverse apparatus is depicted in FIGS. 1 and 2. Inventive apparatus 2 is shown in FIGS. 1 and 2 as incorporated in a spincast-type fishing reel 4. Reel 4 comprises: a frame 6; a foot structure 8, extending from frame 6, for mounting reel 4 on a fishing rod; a front cover 10 secured over the forward face of frame 6; a rear cover 12 secured over the rearward face of frame 6; a line spool 14 mounted on a spool hub 16 projecting from the forward face of frame 6; a main operating shaft 18 slidably and rotatably extending through frame 6 and through hub 16; a helical gear 20, mounted on main shaft 18, for rotating shaft 18; a spinnerhead 22, secured to the forward end of shaft 18, for winding a fishing line around spool 14; and a drive assembly 26 for engaging and rotating helical gear 20.

Drive assembly 26 comprises: a crankshaft 28 extending laterally into reel 4; a crank handle 30 secured on the exterior end of crankshaft 28; and a drive gear 32 mounted on the interior portion of crankshaft 28. Drive gear 32 is preferably a face gear including: a circular body 34 having a forward face 38; and a plurality of gear teeth 40 formed in a circular pattern on the outer periphery of forward face 38. Drive gear 32 preferably also includes a circular recess 42 formed in forward face 38. Recess 42 is encompassed by gear teeth 40.

Inventive anti-reverse apparatus 2 comprises: a ratchet gear 44 mountable on main shaft 18; an engaging structure 46 mountable on crankshaft 28; and a retaining structure 48 for limiting the rotational and axial movement of engaging structure 46.

Ratchet gear 44 is preferably a flat member including a plurality of radially extending ratchet teeth 50 and a central passage 56 for receiving main shaft 18. Ratchet gear 44 is preferably mounted on the rearward portion of main shaft 18 such that forward face of ratchet gear 44 abuts, or is at least adjacent to, the rearward end of helical gear 20. A standard main shaft spring 58 is retained on main shaft 18 against the rearward face of ratchet gear 44 such that spring 58 (a) holds ratchet gear 44 against helical gear 20 and (b) retains helical gear 20 against the rearward face of frame 6.

Each ratchet tooth 50 has a substantially flat leading surface 62 and a rounded back surface 64. Each leading surface 62 is preferably either perpendicular to the rotational axis of ratchet gear 44 or at least slightly inclined toward the forward rotational direction of main shaft 18. Each back surface 64 curves inwardly from the extreme outer edge of one leading surface 62 to the base 67 of the next succeeding surface 62.

The passage 56 extending through ratchet gear 44 preferably includes one or more flat interior surfaces 60. As will be understood by those skilled in the art, interior surfaces 60 are received over corresponding flat surfaces provided on the exterior of main shaft 18. Ratchet gear 44 is thus keyed on main shaft 18 such that main shaft 18 cannot rotate independently of ratchet gear 44.

Ratchet gear 44 and helical gear 20 are preferably separate components. However, if desired, ratchet gear 44 could be formed adjacent helical gear 20 on a single gear sleeve.

It will also be apparent to those skilled in the art that ratchet gear 44 will be smaller, and will therefore be cost less, than a typical crankshaft ratchet gear.

Engaging structure 46 comprises: a round, flat disk portion 70; a circular aperture 76, provided through the center of disk 70, for receiving crankshaft 28; a ratchet-engaging arm 78 projecting from the forward face of disk 70; and a retaining arm 80 projecting from the forward face 72 of disk 70. The diameter of disk 70 is sized to allow placement of disk 70 in the recess 42 of drive gear 32. The length of engaging arm 78 is such that, when disk 70 is received in drive gear recess 42, the distal edge 82 of engaging arm 78 will operably interact with the teeth 50 of ratchet gear 44. Engaging arm 78 is preferably perpendicular to disk face 72.

Retaining arm 80 extends a sufficient distance from forward face 72 for operably contacting retaining structure 48. To ensure smooth interaction between retaining arm 80 and retaining structure 48, retaining arm 80 preferably includes a flat distal surface 84 which is substantially parallel to disk face 72.

If desired, engaging structure 46 can be a metallic member formed by a stamping process. In the stamping process, retaining arm 80 can be formed by the steps of (a) partially stamping a rectangular piece from disk 70 such that the piece remains attached to disk 70 at edge 94; (b) bending the rectangular piece at edge 94 such that the rectangular piece is substantially perpendicular to disk face 72 and (c) bending the rectangular piece at an appropriate midpoint 96 to thus provide flat distal surface 84. Engaging arm 78, on the other hand, can be formed by the steps of (a) partially stamping an L-shaped section from disk 70 such that the section remains attached to disk 70 at edge 86; (b) bending section 70 at edge 86 such that section 70 is substantially perpendicular to disk face 72; and (c) bending section 70 at edge 88 to give engaging arm 78 an L-shaped cross section. When bent in this manner, the ratchet-engaging portion 90 of engaging arm 78 is positioned over, and supported by, disk face 72. The remaining portion 92 of engaging arm 78 is substantially perpendicular to engaging portion 90 and provides additional structural support to engaging arm 78.

Retaining structure 48 projects from the rearward face of frame 6. Retaining structure 48 is preferably a boss integrally formed on frame 6. Retaining structure 48 includes a first portion 114, extending substantially parallel to the rotational axis of crankshaft 28, for limiting the rotational movement of engaging structure 46. Retaining structure 48 also includes a lateral portion 116 for limiting the axial movement of engaging structure 46 to thereby retain engaging structure 46 in drive gear recess 42. Lateral portion 116 is of sufficient depth and length to ensure that, as engaging structure 46 pivots about the rotational axis of crankshaft 28, the end 84 of retaining arm 80 will remain in contact with lateral portion 116.

As drive assembly 26 rotates in forward direction 68, the outer end portion of retaining arm 80 contacts portion 114 of retaining structure 48 such that engaging structure 46 is prevented from rotating with drive assembly 26. However, if drive assembly 26 begins to rotate in reverse direction 120, the frictional contact between disk 70 and crankshaft 28 and between disk 70 and drive gear 32 will carry engaging structure 46 in reverse direction 120 until engaging arm 78 contacts the leading surface 62 of a ratchet tooth 50. The engagement of arm 78 with the ratchet tooth 50 prevents any further reverse rotational movement of main shaft 18 and of drive assembly 26.

When the user then operates crank handle 30 to retrieve the fishing line, main shaft 18 carries ratchet gear 44 in forward direction 122 such that the curved back surfaces 64 of teeth 50 push engaging arm 78 away from engagement with teeth 50. The pushing action of curved surfaces 64 and the frictional contact between engaging structure 46 and drive assembly 26 move engaging structure 46 in forward rotational direction 68. Engaging structure 46 moves in direction 68 until retaining arm 80 contacts, and is retained by, portion 114 of retaining structure 48. Retaining structure 48 stops the rotational movement of engaging structure 46 at a position where structure 46 cannot interfere with the forward rotation of main shaft 18 and of drive assembly 26.

A second embodiment 100 of the engaging structure is depicted in FIG. 7. Engaging structure 100 functions in the same manner as engaging structure 46 and includes: a disk portion 102 having a forward face 104; an engaging boss 106 extending from forward face 104; and a retaining boss 108 extending from face 104. Engaging structure 100 is preferably produced by a molding process wherein engaging boss 106 and retaining boss 108 are integrally formed on disk 102. Engaging boss 106 preferably has a straight distal end/edge 110 which is substantially parallel to disk face 104 and is oriented for flush engagement with the leading surfaces 62 of ratchet teeth 50. Retaining boss 108 preferably includes a flat distal surface 112 which is substantially parallel to disk face 104. Retaining boss 108 preferably has a substantially cylindrical shape.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed:

1. An anti-reverse apparatus for a fishing reel, said fishing reel having: a main operating shaft rotatably mounted in said fishing reel, said main operating shaft having a first direction of rotation and a second direction of rotation; rotating means for rotating said main operating shaft; and drive means for driving said rotating means and thereby rotating said main operating shaft, said drive means having a forward face directed toward said rotating means, and said anti-reverse apparatus comprising:

holding means, mounted on said main operating shaft, for holding said main operating shaft to prevent said main operating shaft from rotating and engaging means, received in a recess provided in said forward face, for engaging said holding means such that said holding means prevents said main operating shaft from rotating in said second direction.

2. The anti-reverse apparatus of claim 1 wherein said holding means is a ratchet gear.

3. The anti-reverse apparatus of claim 1 wherein:

said drive means is rotatably mounted in said fishing reel and said drive means has a forward direction of rotation and a reverse direction of rotation and said engaging means is received in said recess such that, when said drive means rotates in said reverse direction, said drive means will move said engaging means into engagement with said holding means.

4. The anti-reverse apparatus of claim 3 wherein said drive means is a drive gear for operably engaging said rotating means.

5. The anti-reverse apparatus of claim 4 wherein said drive gear is a face gear and said forward face has a periphery with a plurality of gear teeth provided thereon.

6. The anti-reverse apparatus of claim 3 further comprising retaining means for retaining said engaging means in said recess.

7. The anti-reverse apparatus of claim 6 wherein:

said fishing reel further includes a frame and said retaining means comprises a boss projecting from said frame.

8. The anti-reverse apparatus of claim 3 further comprising limiting means for limiting movement of said engaging means when said main operating shaft rotates in said first direction.

9. The anti-reverse apparatus of claim 8 wherein:

said fishing reel further includes a frame and said limiting means comprises a boss projecting from said frame.

10. An anti-reverse apparatus for a fishing reel, said fishing reel having a crankshaft assembly including a crankshaft and a drive gear mounted on said crankshaft, said crankshaft assembly having a forward direction of rotation and a reverse direction of rotation, said drive gear having a forward face with a plurality of gear teeth provided thereon, and said anti-reverse apparatus comprising:

a ratchet member and an engaging structure, received in a recess provided said forward face of said drive gear, for directly engaging said ratchet member, wherein direct engagement of said engaging structure with said ratchet member operates to prevent said crankshaft assembly from rotating in said reverse direction.

11. The anti-reverse apparatus of claim 10 wherein:

said drive gear is a face-type gear;

said forward face has an outer periphery; and said gear teeth are provided on said outer periphery.

12. The anti-reverse apparatus of claim 10 further comprising retaining means for retaining said engaging structure in said recess.

13. The anti-reverse apparatus of claim 12 wherein said fishing reel further includes a frame and said retaining means comprises a boss projecting from said frame.

14. The anti-reverse apparatus of claim 10 further comprising limiting means for limiting rotational movement of said engaging means in said forward direction.

15. The anti-reverse apparatus of claim 14 wherein said fishing reel further includes a frame and said limiting means comprises a boss projecting from said frame.

16. The anti-reverse apparatus of claim 10 wherein said engaging structure comprises:

a plate having a first side and having an aperture extending through said plate for receiving said crankshaft and a first structure, projecting from said first side, for directly engaging said ratchet member.

17. The anti-reverse apparatus of claim 16 wherein:

said engaging structure further comprises a second structure projecting from said first side and said anti-reverse apparatus further comprises limiting means, contactable by said second structure, for limiting movement of said engaging structure.

18. The anti-reverse apparatus of claim 17 wherein said limiting means is contactable by said second structure such that said limiting means limits both rotational and axial movement of said engaging structure.

19. The anti-reverse apparatus of claim 17 wherein said fishing reel further includes a frame and said limiting means consists of a boss projecting from said frame.

20. An anti-reverse apparatus for a fishing reel, said fishing reel having: a main operating shaft rotatably mounted in said fishing reel, said main operating shaft having a first direction of rotation and a second direction of rotation; rotating means for rotating said main operating shaft; and drive means for driving said rotating means and thereby rotating said main operating shaft, said anti-reverse apparatus comprising:

holding means, mounted on said main operating shaft, for holding said main operating shaft to prevent said main operating shaft from rotating and engaging means for engaging said holding means such that said holding means prevents said main operating shaft from rotating in said second direction, said drive means being rotatably mounted in said fishing reel and said drive means having a forward direction of rotation and a reverse direction of rotation, said engaging means being incorporated in said drive means such that, when said drive means rotates in said reverse direction, said drive means will move said engaging means into engagement with said holding means, said drive means includes a drive gear for operably engaging said rotating means, said drive gear including a recess for receiving said engaging means, and said drive gear being a face gear having a forward face, said forward face having a periphery with a plurality of gear teeth provided thereon, and said recess being provided in said forward face.

21. An anti-reverse apparatus for a fishing reel, said fishing reel having a crankshaft assembly including a crankshaft and a drive gear mounted on said crankshaft, said crankshaft assembly having a forward direction of rotation and a reverse direction of rotation and said anti-reverse apparatus comprising:

a ratchet member and an engaging structure, incorporated in said crankshaft assembly, for directly engaging said ratchet member, wherein said direct engagement of said engaging structure with said ratchet member operates to prevent said crankshaft assembly from rotating in said reverse direction, said drive gear having a recess formed therein and said engaging structure being received in said recess, said drive gear being a face-type gear having a forward face, said forward face having an outer periphery, said drive gear including a plurality of gear teeth provided on said outer periphery, and said recess being provided in said forward face.

* * * * *